US007030683B2

(12) United States Patent
Pan et al.

(10) Patent No.: US 7,030,683 B2
(45) Date of Patent: Apr. 18, 2006

(54) FOUR PHASE CHARGE PUMP OPERABLE WITHOUT PHASE OVERLAP WITH IMPROVED EFFICIENCY

(75) Inventors: Feng Pan, San Jose, CA (US); Trung Pham, Fremont, CA (US)

(73) Assignee: Sandisk Corporation, Sunnyvale, CA (US)

( * ) Notice: Subject to any disclaimer, the term of this patent is extended or adjusted under 35 U.S.C. 154(b) by 18 days.

(21) Appl. No.: 10/842,910

(22) Filed: May 10, 2004

(65) Prior Publication Data

US 2005/0248386 A1  Nov. 10, 2005

(51) Int. Cl.
*G05F 3/02*     (2006.01)
(52) U.S. Cl. ...................................... 327/536; 327/537
(58) Field of Classification Search ............... 327/536, 327/537; 363/90, 60
See application file for complete search history.

(56) References Cited

U.S. PATENT DOCUMENTS

| 5,754,476 | A  | * | 5/1998  | Caser et al. ............ 365/185.29 |
| 6,175,264 | B1 | * | 1/2001  | Jinbo ......................... 327/536 |
| 6,292,048 | B1 | * | 9/2001  | Li .............................. 327/536 |
| 6,373,324 | B1 | * | 4/2002  | Li et al. ..................... 327/536 |
| 6,452,438 | B1 | * | 9/2002  | Li .............................. 327/536 |
| 6,690,227 | B1 | * | 2/2004  | Lee et al. .................... 327/536 |
| 2003/0214346 | A1 | * | 11/2003 | Pelliconi ..................... 327/536 |
| 2005/0088220 | A1 | * | 4/2005  | Hahn et al. ................. 327/536 |
| 2005/0146375 | A1 | * | 7/2005  | Ker et al. .................... 327/536 |

OTHER PUBLICATIONS

"*Charge Pumps: An Overview*", Louie Pylarinos, Edward S. Rogers Sr. Department of Electrical and Computer Engineering University of Toronto, http://www.eecg.toronto.edu/~kphang/ece1371/chargepumps.pdf, Downloaded Aug. 27, 2004, 7 pages.

* cited by examiner

*Primary Examiner*—Terry D. Cunningham
(74) *Attorney, Agent, or Firm*—Beyer Weaver & Thomas LLP

(57) ABSTRACT

In a Dickson type charge pump in which a plurality of serially connected diodes sequentially respond to anti-phase 50/50 clock cross over or overlapped ($\phi 1$, $\phi 2$), efficiency of the charge pump is increased by providing with each diode a charge transfer transistor in parallel therewith between two adjacent nodes, and driving the charge transfer transistor to conduction during a time when the parallel diode is conducting thereby transferring any residual trapped charge at one node through the charge transfer transistor to the next node. Operating frequency can be increased by providing a pre-charge diode coupling an input node to the gate of the charge transfer transistor to facilitate conductance of the charge transfer transistor, and by coupling the control terminal of the charge transfer transistor to an input node in response to charge on an output node to thereby equalize charge on the control terminal and on the input node during a recovery period.

4 Claims, 1 Drawing Sheet

FOUR PHASE CHARGE PUMP OPERABLE WITHOUT PHASE OVERLAP WITH IMPROVED EFFICIENCY

BACKGROUND OF THE INVENTION

This invention relates generally to electric circuits that generate a voltage larger than a supply voltage from which they operate by the switching of charge along serial capacitive cells, known as charge pumps.

A well known charge pump is the Dickson charge pump, which is shown in FIG. 1. As described by Louie Pylarinos of the University of Toronto in "Charge Pumps: An Overview", the circuit has two pumping clocks which are antiphased and have a voltage amplitude of $V\phi$ or $\overline{V\phi}$. Serial diodes or diode connected NMOSFETS, D1–D4, operate as self-timed switches characterized by a forward biased voltage, Vt, which is the threshold voltage of each diode. Each diode has a stray capacitance, Cs, associated therewith. The charge pump operates by pumping charge along the diode chain as capacitors C1–C4 are successively charged and discharged during each clock cycle. For example, when $V\phi$ goes high, diode D1 conducts and the voltage at its anode, V1, is boosted by voltage $V\phi$ and transferred to node V2 less a voltage drop, Vt, associated with diode D1. Then when $V\phi$ goes low, and $\overline{V\phi}$ goes high, the charge at node V2 is transferred to node V3 less a voltage drop, Vt, associated with diode V2. After N stages, it is seen that the output voltage is $$V_{out}=V_{in}+N \cdot (V_\phi-V_d)-V_d \quad (1)$$

The stray capacitance, Cs, can be taken into account by noticing that it reduces the transferred clock voltage, $V_\phi$, by a factor $$\frac{C}{C+C_s}.$$

Thus, the actual output voltage becomes $$V_{out} = V_{in} + N \cdot \left(\left(\frac{C}{C+C_s}\right) \cdot V_\phi - V_d\right) - V_d \quad (2)$$

Until now is has been assumed that no load was connected to the output of the charge pump. In the presence of such a load which draws a current, Iout, the output voltage is reduced by an amount $$\frac{N \cdot I_{out}}{(C+C_s) \cdot f_{osc}},$$

where fosc is the operating frequency of the charge pump. The output voltage now becomes $$V_{out} = V_{in} + N \cdot \left(\frac{C}{C+C_s} \cdot V_\phi - V_d - \frac{I_{out}}{(C+C_s) \cdot f_{osc}}\right) - V_d \quad (3)$$

From this equation it becomes apparent that the voltage multiplication will occur only if $$\frac{C}{C+C_s} \cdot V_\phi - V_d - \frac{I_{out}}{(C+C_s) \cdot f_{osc}} > 0 \quad (4)$$

Following Dickson, eq (3) can be written as $$V_{out} = V_O - I_{out} \cdot R_s \text{ where} \quad (5)$$

$$V_O = V_{in} - V_d + N \cdot \left(\frac{C}{C+C_s} \cdot V_\phi - V_d\right) \text{ and} \quad (6)$$

$$R_s = \frac{N}{C+C_s \cdot f_{osc}} \quad (7)$$

Equation (3) leads to an equivalent circuit of the charge pump as shown in FIG. 2.

Limitations of the Dickson charge pump when implemented with NMOS transistors or diode connected transistors lies in the trapped charge associated with each node due to the threshold voltage, $V_t$, of each NMOS diode. While increasing capacitor charge reduces effective series resistance, $R_s$, there is a practical limitation of capacitor size in an integrated circuit. While clock frequency, $f_{osc}$, reduces series resistance, the charge must be able to be transferred from node to node within a cycle, otherwise increasing frequency will not improve pump performance.

SUMMARY OF THE INVENTION

A more efficient charge pump is provided by altering the Dickson charge pump in accordance with the present invention.

To facilitate charge transfer from one node to the next node, a parallel transistor is provided with each transfer diode whereby residual trapped charge of each node is transferred by the transistor. This requires a transistor clock within each cycle of the diode clock.

Clock frequency can be increased by providing with each parallel tansistor a pre-charge diode to pre-charge the gate of the parallel transistor after the input node charge is raised but before the charge transfer. This facilitates the conductance of the transistor with each transistor cycle.

During pre-charge, the pre-charge diode guarantees pre-charge of gate T1, the parallel transistor, without the need for clock phase overlap. A recovery transistor couples the gate of the parallel transistor to the input node to return transistor bias voltage to source voltage in the recovery period where the input node again goes low and the output node is high. Unlike known four phase charge pumps which require overlap of the pumping clocks, the charge pump in accordance with the invention can operate with 50/50 clock pulses having no overlap.

The invention and objects and features thereof will be more readily apparent from the following detailed description and appended claims when taken with the drawings.

DETAILED DESCRIPTION OF ILLUSTRATED EMBODIMENT

Figure 1:
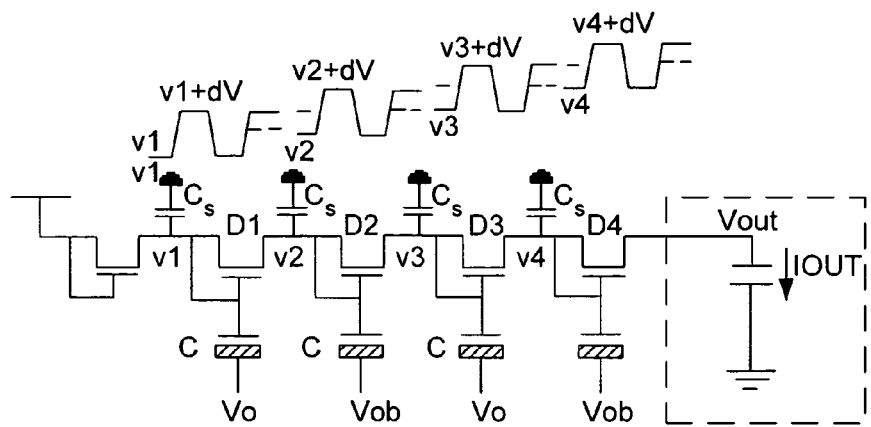
FIG. 1 illustrates a prior art Dickson charge pump.
Figure 2:
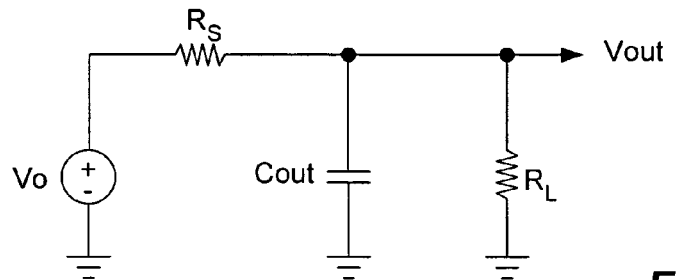
FIG. 2 illustrates an equivalent circuit of the Dickson charge pump.
Figure 3:
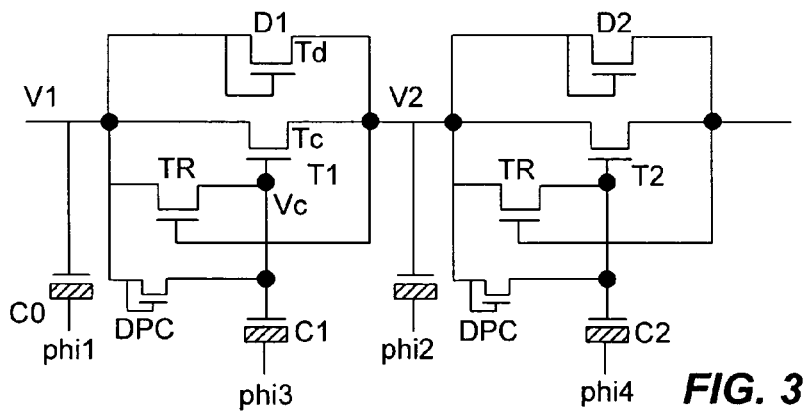
FIG. 3 is a schematic of a charge pump in accordance with one embodiment of the invention.

FIG. 3 is a schematic of a charge pump in accordance with one embodiment of the invention in which the cells of the conventional Dickson charge pump are modified to facilitate charge transfer and to accommodate a higher clock frequency or $f_{osc}$. FIG. 3 shows two adjacent cells, such as diodes D1 and D2 of the Dickson charge pump of FIG. 1, for transferring charge from node V1 to node V2. Each cell is modified by providing a MOS transistor T1 or T2 in parallel with diode D1 or diode D2 which facilitate the transfer of residual trapped charge at each node. A recovery transistor TR is connected between the gate of transistor T1 and node V1 with the gate of transistor TR controlled by the voltage on node V2. When charge is transferred from node V1 to node V2, the increased voltage at node V2 causes transistor TR to conduct and bring the voltage on the gate of transistor T1 to the voltage level of node V1. After clock ϕ3 is removed, the conductance of transistor T1 is terminated.

Figure 4:
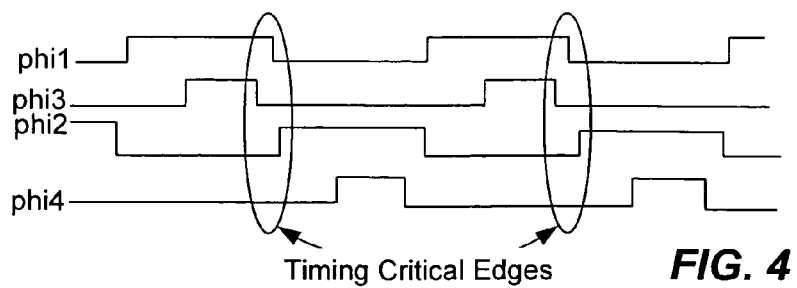
FIG. 4 illustrates clocks for operating the charge pump of FIG. 3.

FIG. 4 illustrates the four phase clock operation of the charge pump of FIG. 3. Charge transfer from node V1 to node V2 must occur during clock cycle ϕ1 when charge coupled through capacitor C0 raises the charge of node V1 and forward biases diode D1 which partially transfers the charge to node V2.

Transistor T1 is in parallel with diode D1 and conducts in response to clock ϕ3 which is shorter than clock ϕ1 and lies within clock cycle ϕ1. Thus, when ϕ1 goes high, diode D1 conducts but the current is limited because of the high $V_t$ of the diode. After a short delay, to allow pre-charge from V1 to the gate of T1, clock ϕ3 pumps node VC high and transistor T1 conducts fully and transfers the remaining trapped charge at node V1 to node V2, with node V1 and node V2 equalized. This operation is repeated for diode D2 and transistor T2 when clock ϕ2 is high for stage 2.

After charge is transferred from node V1 to node V2 in the first half cycle (Phi1=1, Phi2=0, Phi3=1, Phi4=0), Phi3 goes from 1 to 0 bring down the gate of T1 back to the pre-charge level before charge is transferred. T1 is weakly on at this point or T1 could be completely off depending upon pump operations. In the second half cycle (Phi1=0, Phi2=1), V2 is coupled up by Phi2, V1 is coupled down by Phi1, transistor TR is turned on (V2−V1−$V_t$>0) and brings the voltage on the gate of transistor T1 to the voltage level of node V1. Since the voltages of T1 gate and source are the same, T1 is completely shut off to prevent any backward leakage.

To facilitate the conductance of transistor T1 in response to clock ϕ3, a pre-charge diode DPC is connected between node V1 and the gate of transistor T1 to apply V1 minus $V_t$ on the gate of transistor T1 before charge transfer. Then, any rise of clock ϕ3 will cause the immediate conduction of transistor T1 and accelerate the transfer of residual charge through transistor T1.

During pre-charge, the pre-charge diode guarantees pre-charge of gate T1, the parallel transistor, without the need for clock phase overlap. Before recovery, since Phi3 goes low before Phi1/Phi2 clocks switch, gate of T1 is returned to pre-charge level, which could be slightly higher (initial ramp up phase) or lower (after initial ramp up phase) than after V1 node fully transfers charge to V2, and T1 could be slightly on or off. In recovery phase, V2 is coupled high and V1 is coupled low, and if it is 50/50 transition, the gate of T1 is a very low capacitive node compared with that of V1, V2 nodes. The gate of TR is at V2 voltage, which is much higher than gate of T1, and the charge on gate of T1 can be quickly discharged. Even if T1 could be slightly turned on during the recovery phase, since its gate is discharged to source quickly, it is in weak conduction state, the amount of charge that could potentially leak backward from V2 to V1 is a very small percentage of charge transferred. If the recovery phase and clock phases are overlapped, it is more like normal four phase charge pump recovery. By using 50/50 clock phases in recovery, no overlap of clocks is required, the clock can run at faster frequencies and the gain of high frequency is much more significant when compared with any potential loss of charge by leakage during recovery transition.

As noted above, turn on and turn off of transistor T1 is facilitated by the guaranteed pre-charge of the gate of transistor T1 to the voltage on node V1 minus $V_t$ prior to turn on, and the equalizing of voltage at the gate of transistor T1 and the voltage at V1 in recovery. This guaranteed pre-charging and recovery permits maximum charge transfer forward and minimum charge leakage backward. Moreover, the charge pump can operate with 50% cross over of clocks, or overlap of overlap clocks ϕ1 and ϕ2, which is unlike prior art four phase charge pumps which require ϕ1 and ϕ2 overlap to do both pre-charge and discharge of gate equivalent T1 transistor. Because charge can be fully transferred by boosted T1 transistor, without $V_t$ drop, capacitance can be reduced per stage to have the same efficiency since no $V_t$ drops. The equivalent resistance of T1 is much smaller due to boosted gate voltage, and the RC delay per stage to fully transfer charge is much smaller compared with the normal Dickson charge pump. Clock frequency can be in creased due to the smaller RC delay, and faster clock frequency can allow even smaller capacitance per stage to be used to meet the same performance. Accordingly, the charge pump in accordance with the invention permits greater efficiency in charge transfer with the same size capacitors as in the prior art Dickson charge pump.

While the invention has been described with reference to a specific embodiment, the description is illustrative of the invention, and is not to be construed limiting the invention. Various modifications and applications may occur to those skilled in the art without departing from the true spirit and scope of the invention as defined by the appended claims.

What is claimed is:

1. A charge pump comprising a plurality of serially connected cells for pumping and transferring charge along a series of nodes between the cells, each cell including:
   a) a charge transfer diode connected between adjacent nodes and responsive to an increasing charge at one node in response to a first clock, ϕ1, or a second anti-phase second clock, ϕ2,
   b) a charge transfer transistor connected between the adjacent nodes in parallel with the charge transfer diode and responsive to a third clock, ϕ3, within the period of clock ϕ1 or to a fourth clock ϕ4 within the period of clock ϕ2,
   c) a recovery transistor for equalizing charge on the control terminal of the charge transfer transistor to charge on the input node during a recovery period, and
   d) a pre charge diode coupling an input node to a control terminal of the charge transfer transistor to facilitate the conductance of the charge transfer transistor in response to the third clock (ϕ3) or the fourth clock (ϕ4), whereby each charge transfer diode transfers charge from one node to a next node in response to one of said first and second clocks ($\phi 1$ or $\phi 2$) and each charge transfer transistor transfers residual trapped charge at the one node to the next node while the charge transfer diode is conducting charge.

2. The charge pump as defined by claim 1 wherein each diode comprises a diode NMOSFET and each charge transfer transistor comprises a NMOSFET.

3. A method of increasing efficiency in charge transfer in a charge pump having a plurality of serially connected diodes which sequentially respond to anti-phase pumping clocks ($\phi 1$, $\phi 2$) comprising the steps of:
 a) providing for each diode a charge transfer transistor in parallel therewith between two adjacent nodes,
 b) driving the charge transfer transistor to conduction during a time when the parallel diode is conducting, thereby transferring any residual trapped charge at one node through the charge transfer transistor to the next node,
 c) coupling the control terminal of the charge transfer transistor to an input node in response to charge on an output node to thereby equalize charge on the control terminal and on the input node during a recovery period, and
 d) precharging a control terminal of the charge transfer transistor to facilitate the conductance of the charge transfer transistor.

4. The method as defined by claim 3 wherein each diode comprises a diode connected NMOSFET and each charge transfer transistor comprises a NMOSFET.

* * * * *